(12) United States Patent
Kim

(10) Patent No.: US 7,218,032 B2
(45) Date of Patent: May 15, 2007

(54) MICRO POSITION-CONTROL SYSTEM

(75) Inventor: Jun-hyung Kim, Suwon-si (KR)

(73) Assignee: Samsung Electronics Co, Ltd., Gyeonggi-do (KR)

( * ) Notice: Subject to any disclaimer, the term of this patent is extended or adjusted under 35 U.S.C. 154(b) by 0 days.

(21) Appl. No.: 11/193,376

(22) Filed: Aug. 1, 2005

(65) Prior Publication Data

US 2006/0028098 A1 Feb. 9, 2006

(30) Foreign Application Priority Data

Aug. 6, 2004 (KR) ...................... 10-2004-0062092

(51) Int. Cl.
*H01L 41/09* (2006.01)
*H02N 2/04* (2006.01)

(52) U.S. Cl. .................. 310/323.17; 310/328

(58) Field of Classification Search .......... 310/323.17, 310/328, 330, 331, 332; 250/442.11
See application file for complete search history.

(56) References Cited

U.S. PATENT DOCUMENTS 6,294,859 B1 * 9/2001 Jaenker ...................... 310/328
6,891,601 B2 * 5/2005 Jeanne et al. ................. 355/72

2005/0231075 A1 * 10/2005 Xu .............................. 310/328

FOREIGN PATENT DOCUMENTS

| JP | 58-12335 A | 1/1983 |
| JP | 6-204107 A | 7/1994 |
| JP | 7-86377 A | 3/1995 |
| JP | 2003-258071 A | 9/2003 |
| KR | 10-0396020 B1 | 8/2003 |

* cited by examiner

*Primary Examiner*—Darren Schuberg
*Assistant Examiner*—Derek Rosenau
(74) *Attorney, Agent, or Firm*—Sughrue Mion, PLLC

(57) ABSTRACT

A micro position-control system capable of more precisely controlling three degree-of-freedom motions, namely, a Z-direction motion and X-axis and Y-axis rotations. The micro position-control system includes a base including a plurality of base units disposed at equal angles from the center of a motion stage, holding piezo actuators parallel to a direction of the disposition of the base units, a plurality of bridge units disposed to face the base units, converting a displacement in a length direction of the piezo actuators into a displacement that is vertical with respect to a bottom surface of the base, the motion stage making at least one of a translation motion in the vertical direction, a rotation about a first axis perpendicular to the vertical direction, and a rotation about a second axis perpendicular to both the vertical direction and the first axis, and a control unit controlling the piezo actuators.

14 Claims, 10 Drawing Sheets

(a)

(b)

MICRO POSITION-CONTROL SYSTEM

CROSS-REFERENCE TO RELATED APPLICATION

This application claims priority from Korean Patent Application No. 10-2004-0062092 filed on Aug. 6, 2004 in the Korean Intellectual Property Office, the disclosure of which is incorporated herein by reference in its entirety.

BACKGROUND OF THE INVENTION

1. Field of the Invention

The present invention relates to micro position-control systems and, more particularly, to a micro position-control system capable of more precisely controlling three degree-of-freedom motions, namely, a Z-direction motion, an X-axis rotation, and a Y-axis rotation.

2. Description of the Related Art

As is well known, the importance of micro position systems in industry increases day by day. Particularly, the development of semiconductor technology requires a high integration of a circuit, and consequently, a line width used in up-to date microprocessor circuits is about 0.18 µm. In this case, a motion stage for manufacturing a wafer requires precision that is reproducible corresponding to 20 nm, which is 1/10 of the 0.18 µm line width. A submicron-level micro transfer apparatus is widely utilized, and can be applied to a micro measurement field (such as, an atomic force microscope (AFM), a scanning electron microscope (SEM), and the like) and to an industrial field, such as, information technology (IT).

General position-control systems using a linear motor or both a servo motor and a ball screw have a relatively long stroke distance but have a limit to the position precision that can be achieved due to a structural limit, such as a backlash or the like. Also, general position-control systems have a drawback of becoming high due to vertically arranging actuators for the purpose of obtaining vertical motion. This drawback causes much difficulty in performing a vertical position control in works that require high precision.

Micro-precise position-control systems that move by a distance of micrometers or less must be designed to not generate friction in order to remove or minimize a non-linear factor. Also, actuators used in the micro-precise position-control systems must be easily driven through a distance of micrometers or less and must be highly repetitive.

Hence, in the field of micro position-control technology, a position control technique using the piezo effect is generally used. The piezo effect denotes a phenomenon in which when a piezo actuator is deformed by an external force applied to a special crystal of the piezo actuator, voltage is generated on a surface of the piezo actuator, and alternatively, when voltage is applied to the crystal, a displacement or a force is generated. Examples of materials that produce such a piezo effect include crystal, tourmaline, titanium, barium oxide, and the like. The piezo effect is applied to micro position-control technology, electroacoustic transducers, piezoelectric purification, supersonic humidifiers, fish finders, supersonic diagnostic devices, and the like.

Korean Patent No. 396020 (hereinafter, referred to as a related patent) discloses a conventional position-control system using the piezo effect, whose structure is shown in FIG. 1. In FIG. 1, a first transfer mechanism 30 (with piezo actuator 31), a second transfer mechanism 40 (with piezo actuator 41), and a third transfer mechanism 50 (with piezo actuator 51) can create translation in the X and Y directions and rotation in the Z direction. Also, when a fourth transfer mechanism 60, a fifth transfer mechanism 70, and a sixth transfer mechanism 80 deform piezo actuators by applying a voltage to the piezo actuators, a motion in the Z-direction occurs because of a lever structure of FIG. 2. A motion stage 20 having six degrees of freedom is formed by combining the six transfer mechanisms 30, 40, 50, 60, 60, 70, and 80 together.

The motion stage 20 is manufactured to have six degrees of freedom in a relatively simple shape. Each hinge is made circular, and hinges of six degrees of freedom are simultaneously attached to a single moving object.

Referring to FIGS. 1 and 2, the fourth, fifth and sixth transfer mechanisms comprise a piezoelectric actuator 61, 81, 71 a first hinge 62, 72, 82 a second hinge 63, 73, 83, a fixing block 64, 74, 84, a third hinge 67, 77, 87, and a lever 68, 78, 88 which make the motion stage 20 translate along a Z-axis, which corresponds to a vertical motion, and rotate around the X-axis and Y-axis. The first, second, and third transfer mechanisms 30, 40, and 50 interlock with the fourth, fifth, and sixth transfer mechanisms 60, 70, and 80, and make an X-axis translation, a Y-axis translation, and a Z-axis rotation, respectively, so that the motion stage 20 can make six degree-of-freedom motions with respect to the base 10.

In the related patent, first, a thin circular hinge portion is prone to be deformed in all directions as well as being bent. Hence, the rigidity and stability of the entire system are very poor.

Second, since ends of all piezo actuators are simultaneously fixed to the motion stage 20, a parasitic motion in which motions in all directions affect one another occurs. Hence, a precise operation of the position-control system is difficult. In other words, to move the motion stage 20 in a specific direction, inputs that enter all drivers must be either calculated simultaneously or calculated through feedback control. Thus, control is difficult.

Third, since the thin hinge portion receives a large force directly from piezo actuators, the thin hinge portion is very likely to be broken or plastically deformed even by a small external force.

Fourth, since the lever structure of FIG. 2 rotates about a hinge 63 instead of making a perfect vertical motion, the lever structure causes a motion in an undesired direction. Finally, since the system is not designed to perform displacement amplification, a moving range of the motion stage 20 is restricted to a deformation range of a piezo actuator in which the piezo actuator can only extend about 0.1% of its length.

The manufacture of a plane motion stage having degrees-of-freedom including an X-direction translation motion, a Y-direction translation motion, and a Z-axis rotation is easy because of manufacturing characteristics of an elastic hinge mechanism used in an existing micro position-control system. However, the manufacture of a plane motion stage having degrees-of-freedom including a Z-direction translation motion, an X-axis rotation, and a Y-axis rotation is not easy because wire electro-discharge machining, which is generally used to manufacture an elastic hinge, cannot achieve three-dimensional machining, it can only achieve two-dimensional machining.

In addition, although a stacked piezo actuator, which is frequently used as a driving source of a micro driving mechanism, has great driving power and excellent resolving power of several nanometers or less, the stacked piezo actuator has a drawback in that its deformation range is limited to about 0.1% of the overall length of the actuator. Accordingly, when a motion stage needs to move in the Z-direction, its height increases. Therefore, there is a demand for an elastic hinge mechanism that can decrease an overall height of a motion stage and also generate a large displacement in the Z-direction.

SUMMARY OF THE INVENTION

The present invention provides a position-control system that can move in a wide range by keeping the overall height of a motion stage within a predetermined range (e.g., 25 mm) using an elastic hinge mechanism having a bridge structure and also by mechanically amplifying an amount of deformation of a piezo actuator. The present invention also provides a position-control system that can control the degrees-of-freedom of a Z-direction translation motion and X-axis and Y-axis rotations with greater precision.

According to an aspect of the present invention, there is provided a micro position-control system including a base having a plurality of base units disposed at equal angles toward a center of a motion stage, holding piezo actuators parallel to a direction of the disposition of the base units, a plurality of bridge units disposed to face the base units, converting a displacement in a length direction of the piezo actuators into a displacement in a direction vertical to a bottom surface of the base, the motion stage making at least one of a translation motion in the vertical direction, a rotation about a first axis perpendicular to the vertical direction, and a rotation about a second axis perpendicular to both the vertical direction and the first axis, and a control unit controlling the piezo actuators.

The base units may include hinge springs which are elastic in the length direction of the piezo actuators.

Each of the hinge springs may be formed by alternately arranging straight slots and horizontally asymmetrical half-square-shaped slot pairs along a length direction on each of the base units.

In addition, each of the base units may include a movable hole moving in the length direction of the piezo actuator by an action of the hinge spring when a lengthwise displacement occurs in the piezo actuator, and a fixed hole that is fixed regardless of the occurrence of a displacement of the piezo actuator, wherein the movable hole of the base unit is coupled to one end of the bridge unit, and the fixed hole of the base unit is coupled to the other end of the bridge unit.

Each of the bridge units may include a plurality of hexahedral bridge blocks that are aligned in the length direction of the piezo actuator, and adjacent bridge blocks are connected together by an elastic hinge.

Each of the base units may include a movable hole moving in the length direction of the piezo actuator due to an action of the hinge spring when a lengthwise displacement occurs in the piezo actuator, and a fixed hole that is fixed regardless of the occurrence of a displacement of the piezo actuator, wherein the movable hole of the base unit is coupled to a bottom surface of a bridge block that is farthest from the center of the motion stage, and the fixed hole of the base unit is coupled to a bottom surface of a bridge block that is nearest to the center of the motion stage.

An upper surface of a block existing in the middle of the alignment of the bridge units may be coupled to the motion stage.

The elastic hinges and the bridge units may be formed in one body, and the elastic hinges which are connected to the bridge block in the middle of the alignment of the bridge unit may be higher than the elastic hinges which are not connected to the bridge block at the middle of the alignment of the bridge units.

A ratio of a height change of the bridge unit to a length change of the piezo actuator may be controlled using a length of the bridge unit and a difference between heights of the elastic hinges.

The elastic hinges may have thicknesses that are constant in a length direction of the bridge units, or have shapes that are concave at centers in the length direction of the bridge units.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF ILLUSTRATIVE NON-LIMITING EMBODIMENTS OF THE INVENTION

Figure 1:
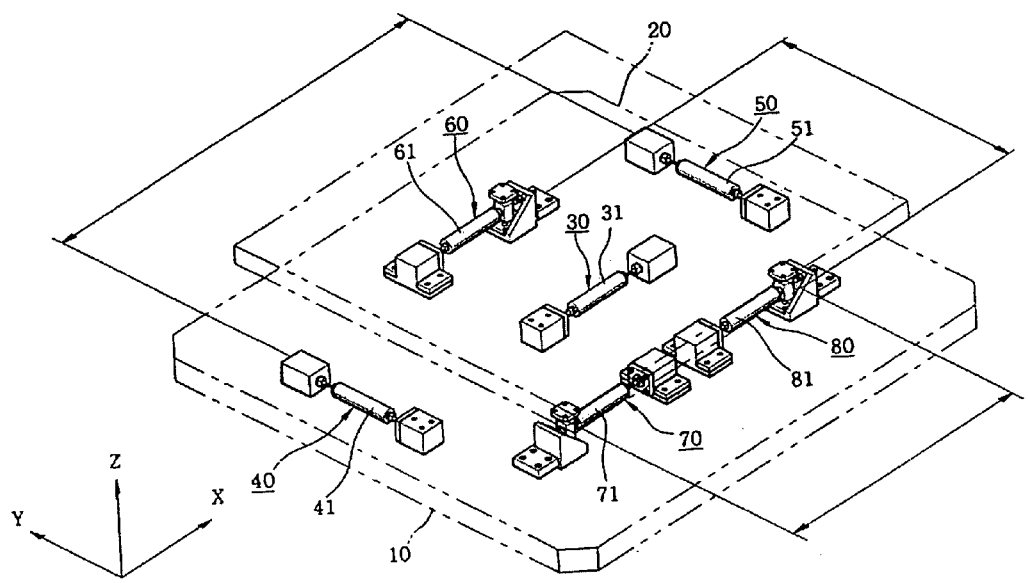
FIG. 1 is a perspective view of a conventional position-control system.
Figure 2:
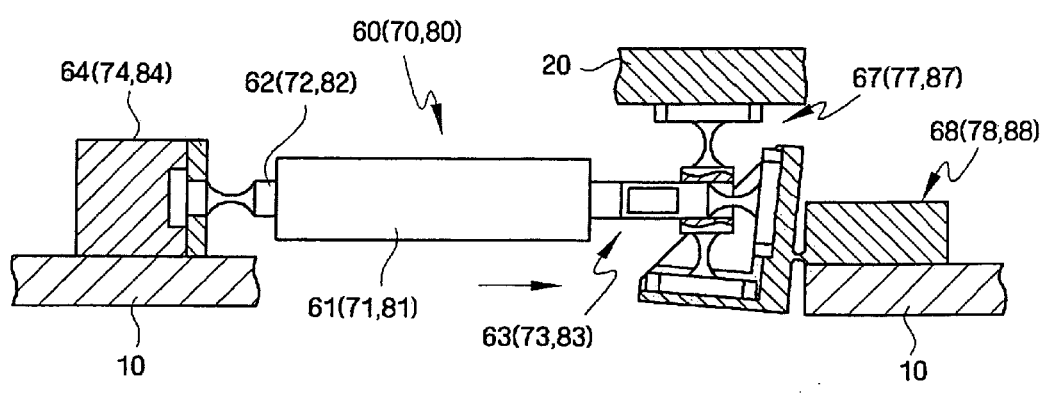
FIG. 2 is a cross-section for explaining a principle by which the position-control system of FIG. 1 generates a motion in a Z direction.

The present invention will now be described more fully with reference to the accompanying drawings, in which exemplary embodiments of this invention are shown. Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

Figure 3:
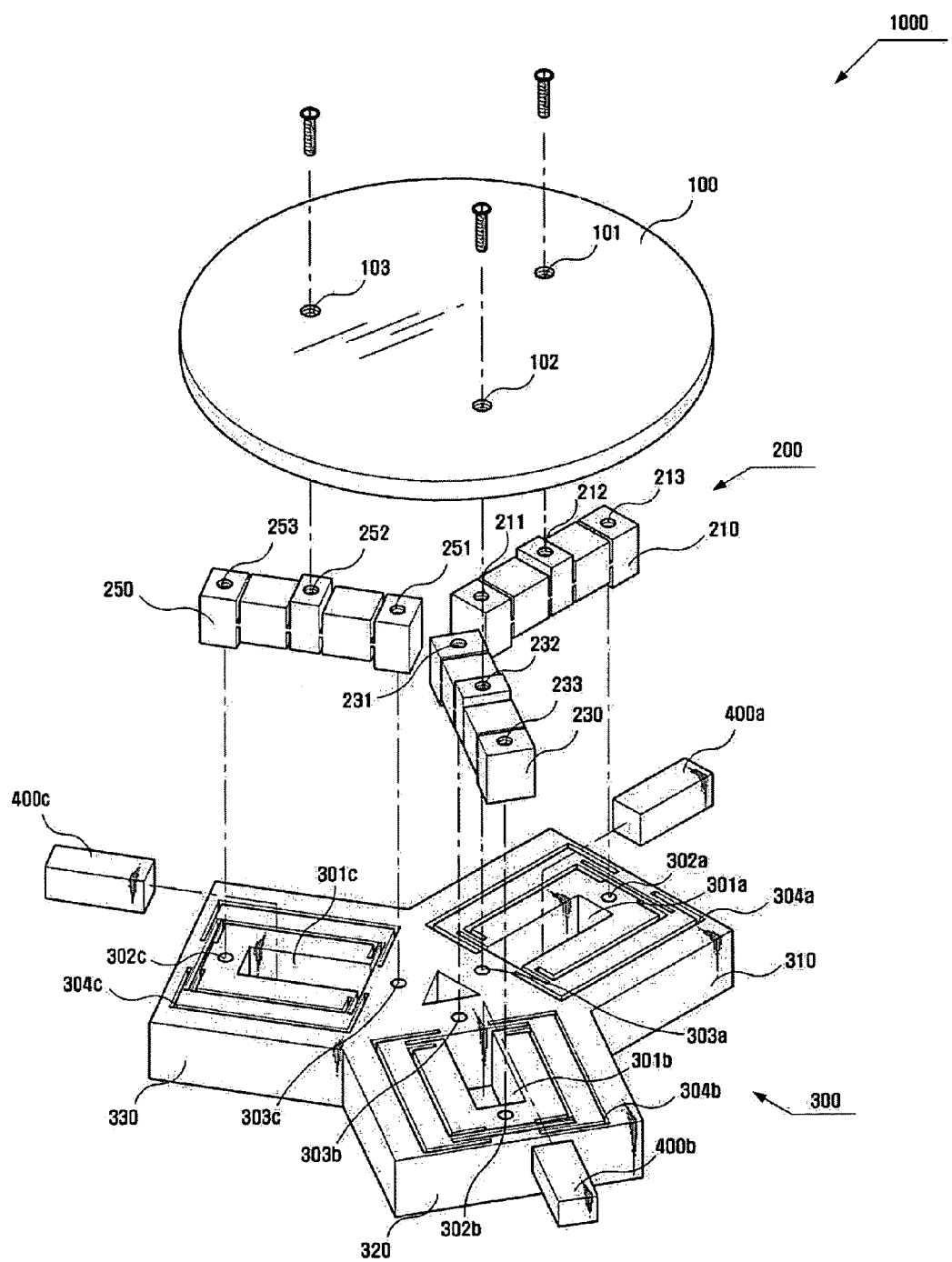
FIG. 3 is an exploded perspective view of a micro position-control system according to an exemplary embodiment of the present invention.

FIG. 3 is an exploded perspective view of a micro position-control system 1000 according to an exemplary embodiment of the present invention. The micro position-control system 1000 includes a motion stage 100, a bridge combination 200, a base 300, piezo actuators 400a, 400b, and 400c, and a control unit (not shown) for controlling displacements of the piezo actuators 400a, 400b, and 400c by adjusting a voltage to be applied to the piezo actuators 400a, 400b, and 400c.

The motion stage 100, the bridge combination 200, and the base 300 are each formed of an elastic metal or other elastic materials that have elasticity with respect to minute displacements. The piezo actuators 400a, 400b, and 400c are displaced by an electrical energy. The displacements of the piezo actuators 400a, 400b, and 400c change distances between fixed holes 303a, 303b, and 303c and movable holes 302a, 302b, and 302c, respectively, in base units 310, 320, and 330.

The base 300 includes the base units 310, 320, and 330, the number of which is equal to the number of bridge units 210, 230, and 250. The base units 310, 320, and 330 include: the fixed holes 303a, 303b, and 303c, respectively, which do not move relative to the ground; the movable holes 302a, 302b, and 302c, respectively, which may move relative to the ground; piezo actuator holding holes 301a, 301b, and 301c, respectively, for holding the piezo actuators 400a, 400b, and 400c; and hinge springs 304a, 304b, and 304c, respectively, which produce a leaf spring effect using a plurality of slots.

When the piezo actuators 400a, 400b, and 400c are displaced, the hinge springs 304a, 304b, and 304c are elastically deformed and simultaneously provide repulsive forces to the piezo actuators 400a, 400b, and 400c. When the piezo actuators 400a, 400b, and 400c are released from the displacements, the hinge springs 304a, 304b, and 304c return to their original positions and shapes. Also, the hinge springs 304a, 304b, and 304c maintain continuity of the displacements of the piezo actuators 400a, 400b, and 400c, and reduce the friction caused by the displacements.

The bridge combination 200 is comprised of a plurality of bridge units, namely, the bridge units 210, 230, and 250. The bridge units 210, 230, and 250 are disposed so that adjacent bridge units are separated by equal angles extending from the center of the motion stage 100, where the equal angles are obtained by dividing 360 degrees by the number of bridge units 210, 230, and 250, that is, three. The bridge units 210, 230, and 250 are each comprised of a plurality of bridge blocks and elastic hinges. The elastic hinges connect the bridge blocks together. First screw holes 212, 232, and 252 for fixing the bridge units 210, 230, and 250 to the motion stage 100 are formed in specific blocks of the bridge blocks of the bridge units 210, 230, and 250, respectively. Second screw holes 211, 231, and 251, to be fixed to the base 300 through the fixed holes 303a, 303b, and 303c, and third screw holes 213, 233, and 253, to be fixed to the base 300 through the movable holes 302a, 302b, and 302c, are formed in other specific blocks of the bridge blocks of the bridge units 210, 230, and 250, respectively.

As the movable holes 302a, 302b, and 302c horizontally move, bridge blocks having the third screw holes 213, 233, and 253 horizontally move, and accordingly, the bridge units 210, 230, and 250 are horizontally displaced. By the action of the elastic hinge springs, the horizontal displacement of the bridge units 210, 230, and 250 causes the bridge units 210, 230, and 250 to be vertically displaced. Hence, bridge blocks having the first screw holes 212, 232, and 252 transmit the vertical displacement of the bridge units 210, 230, and 250 to the motion stage 100. A mechanism by which the horizontal displacement turns into the vertical displacement will be described in greater detail later with reference to FIG. 11.

The motion stage 100 receives a motion from the bridge combination 200 and makes a Z-axis (vertical direction) translation motion, an X-axis (an arbitrary axis perpendicular to the vertical direction) rotation, or a Y-axis (an axis perpendicular to both the Z-axis and X-axis) rotation, namely, three micro degree-of-freedom motions. The motion stage 100 is a plate having a predetermined thickness. The plate may have any shape, such as a circle, a polygon, and so on. An object that must make a micro-motion, such as a semiconductor measuring probe, or an automatic driving device of a mirror in micro optical devices, may be attached to the motion stage 100. Motion stage holes 101, 102, and 103 are formed at three locations on the motion stage 100 corresponding to three vertexes of a triangle to be coupled to the bridge units 210, 230, and 250, respectively.

It is apparent that the hole coupling in the exemplary embodiment may be achieved by any fixing manner, such as a screwing manner, a pin coupling manner, a welding manner, an attachment manner, or the like. Also, the hinge springs 304a, 304b, and 304c and the elastic hinges are deformed only within an elastic region, because a displacement in the micro position-control system is very small.

Figure 4:
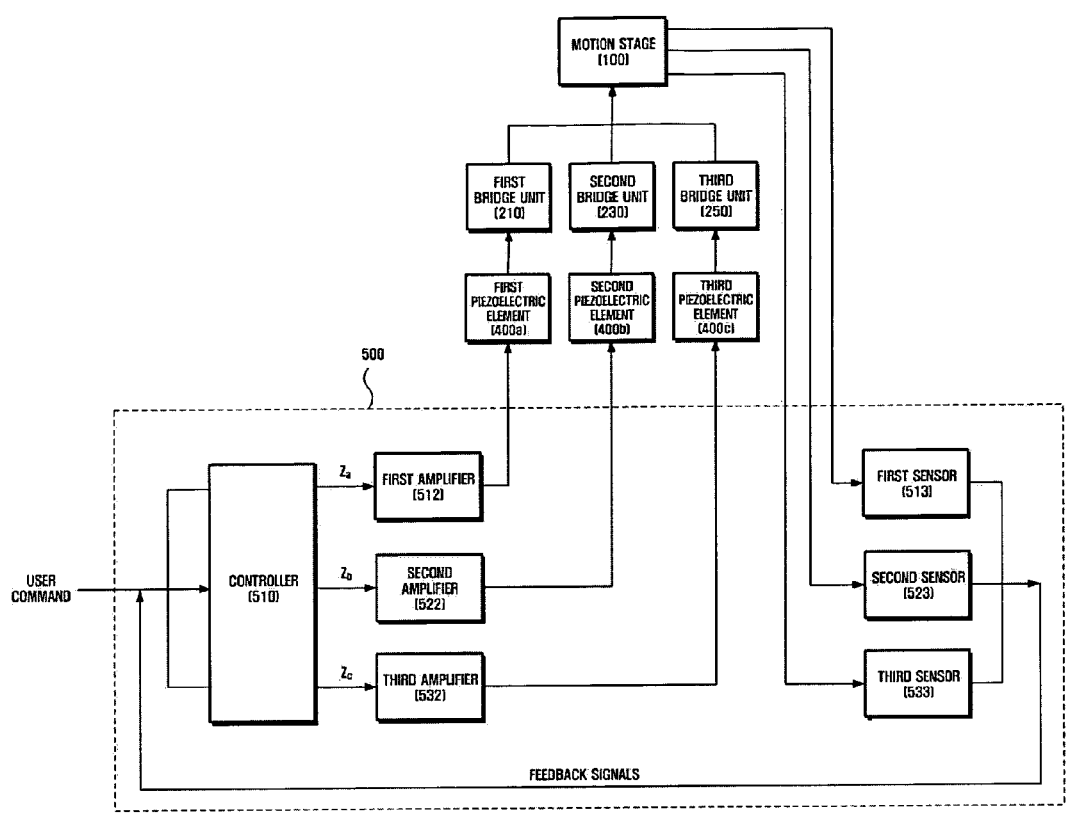
FIG. 4 is a block diagram of a control unit for micro-moving a motion stage.

Referring to FIG. 4, the micro position-control system 1000 includes a control unit 500 for micro-moving the motion stage 100.

The control unit 500 includes: a controller 510 for outputting and controlling a piezo actuator driving signal according to a user's command; first, second, and third amplifiers 512, 522, and 532 for amplifying the piezo actuator driving signal received from the controller 510 and applying the amplified piezo actuator driving signal to the first, second, and third piezoelectric elements 400a, 400b, and 400c; and first, second, and third sensors 513, 523, and 533 for sensing locations to which the motion stage 100 is moved due to the three degree-of-freedom motions received from the bridge units 210, 230, and 250. As described above, the locations to which the motion stage 100 is moved are sensed by the first, second, and third sensors 513, 523, and 533, and the controller 510 corrects the locations of the motion stage 100 due to the three degree-of-freedom motions according to feedback signals received from the first, second, and third sensors 513, 523, and 533.

Each of the first, second, and third sensors 513, 523, and 533 may be comprised of a mirror (not shown) attached to an upper surface of the motion stage 100, and an external laser interferometer (not shown) having a laser that scans the mirror with a laser beam. Instead of the sensors 513, 523, and 533, a capacitor-type micro displacement measuring device may be interposed between the motion stage 100 and the base 300. The first, second, and third amplifiers 512, 522, and 532 are electrically connected to the first, second, and third piezoelectric elements 400a, 400b, and 400c, respectively, via cables.

Figure 5:
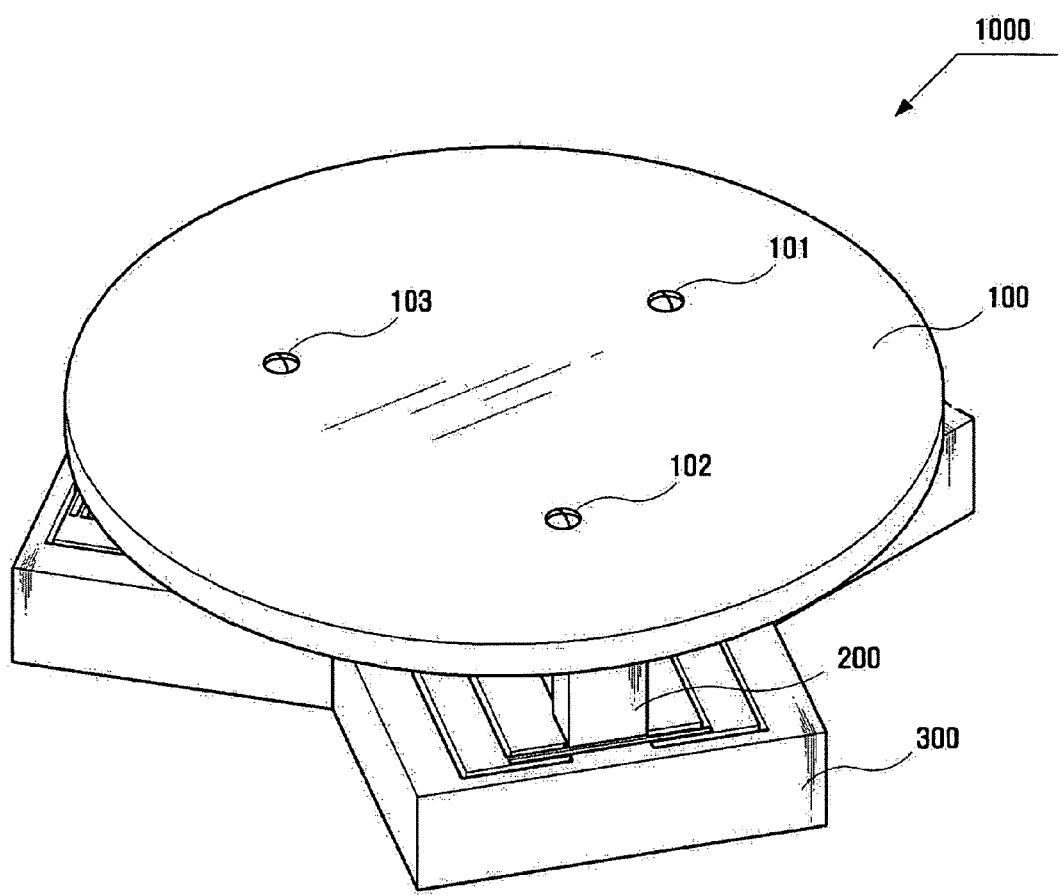
FIG. 5 is a perspective view of a construction into which a motion stage, a bridge combination, and a base, in the position-control system of FIG. 3, are assembled.

FIG. 5 is a perspective view of a construction into which the motion stage 100, the bridge combination 200, and the base 300, in the position-control system 1000 of FIG. 3, are assembled. The motion stage may have a diameter of 90 mm, and the system 1000 may have a height of about 25 mm.

The base units 310, 320, and 330 and the bridge units 210, 230, and 250 are each arranged at intervals of an equal angle that depends on the number of base units or bridge units. In the present embodiment, since the number of base units or bridge units is 3, the base units 310, 320, and 330 are arranged at intervals of 120 degrees, and likewise for the bridge units 210, 230, and 250. This three-point supporting method is adopted to avoid over-constraint in order to achieve a micro motion of the motion stage 100. However, it is natural that a supporting method using more than three points may also be used.

Figure 6:
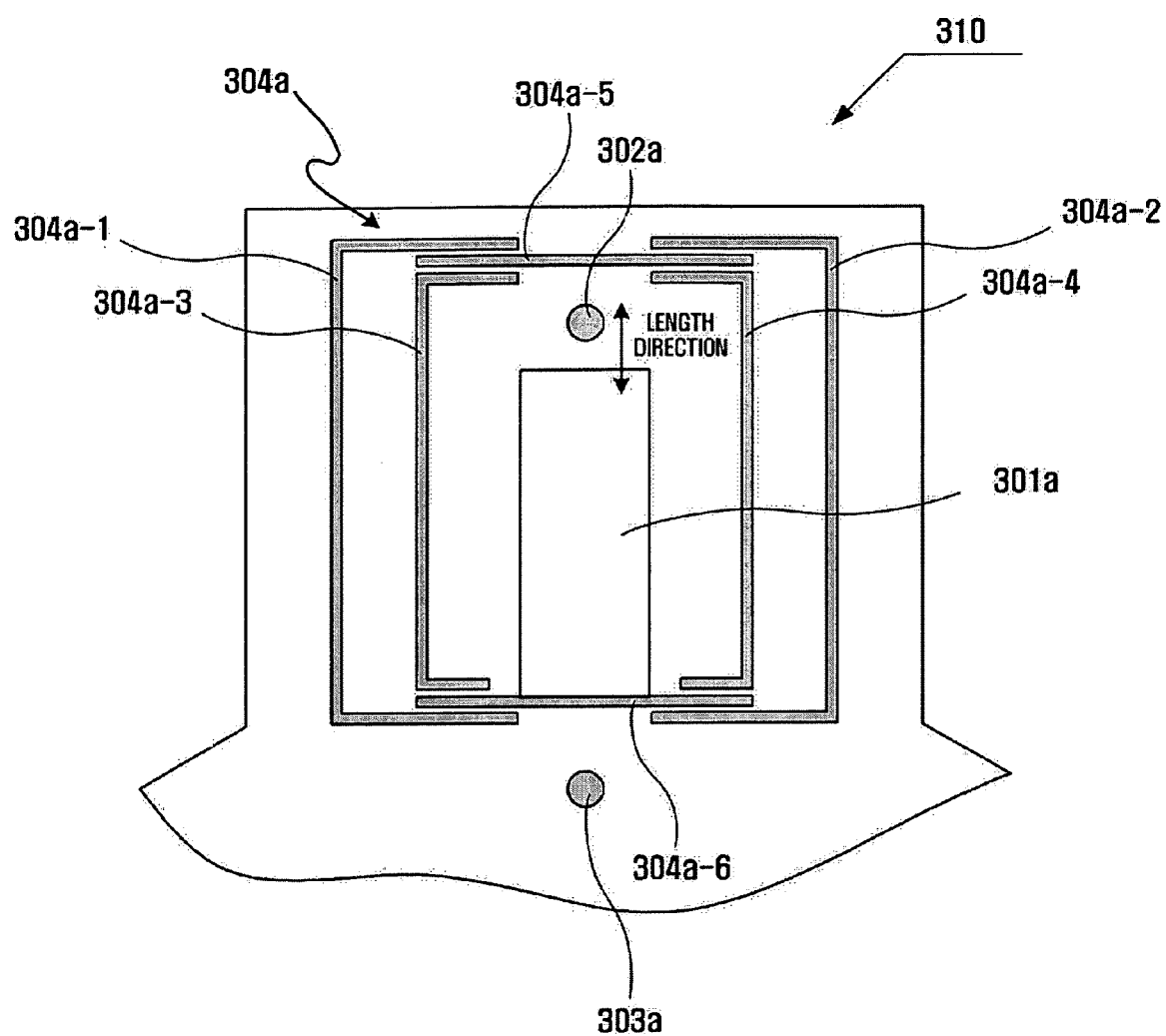
FIG. 6 illustrates a structure of a base unit.

FIG. 6 illustrates a structure of the base unit 310. The base units 320 and 330 have the same structures as the base unit 310. The base unit 310 includes the piezo actuator holding hole 301a, the movable hole 302a, the fixed hole 303a, and the hinge spring 304a. The hinge spring 304a includes a plurality of slots 304a-1, 304a-2, 304a-3, 304a-4, 304a-5, and 304a-6. In FIG. 6, shaded areas denote areas that penetrate in a vertical direction of the drawing.

As shown in FIG. 6, when the slots 304a-1, 304a-2, 304a-3, 304a-4, 304a-5, and 304a-6 alternate in the hinge spring 304a, a structure that functions like a leaf spring is formed. Accordingly, when a displacement in the length direction of a piezo actuator occurs, the hinge spring 304a gives a repulsive force. When the displacement is removed, the hinge spring 304a returns to its original position. As the hinge spring 304a is compressed and expanded as described above, the movable hole 302a moves in the length direction of a piezo actuator, but the fixed hole 303a is fixed.

An accurate return of the hinge spring 304a to its original position upon removal of a displacement is very important in micro position-control systems. Since a displacement used in micro position-control systems is very small, the hinge spring 304a can be deformed within an elastic region of the base unit 310. Consequently, the hinge spring 304a can accurately return to its original position.

The hinge spring 304a is designed such that the linear slots 304a-5 and 304a-6 and the horizontally asymmetrical half-square-shaped slots 304a-1 and 304a-2 (or 304a-3 and 304a-4) alternate in the length direction of a piezo actuator 400a. One of ordinary skill in the art may use slots of other shapes to constitute the hinge spring 304a and control the number of slots used.

The piezo actuator holding hole 301a holds the piezo actuator 400a. A multi-layered piezo actuator that is commonly used is deformed in the range of about 10 μm per centimeter. In the various application fields, a small displacement of a piezo actuator is amplified using an elastic hinge. An elastic hinge has no backlash, does not need to be smoothed, and has a simple design.

Figure 7:
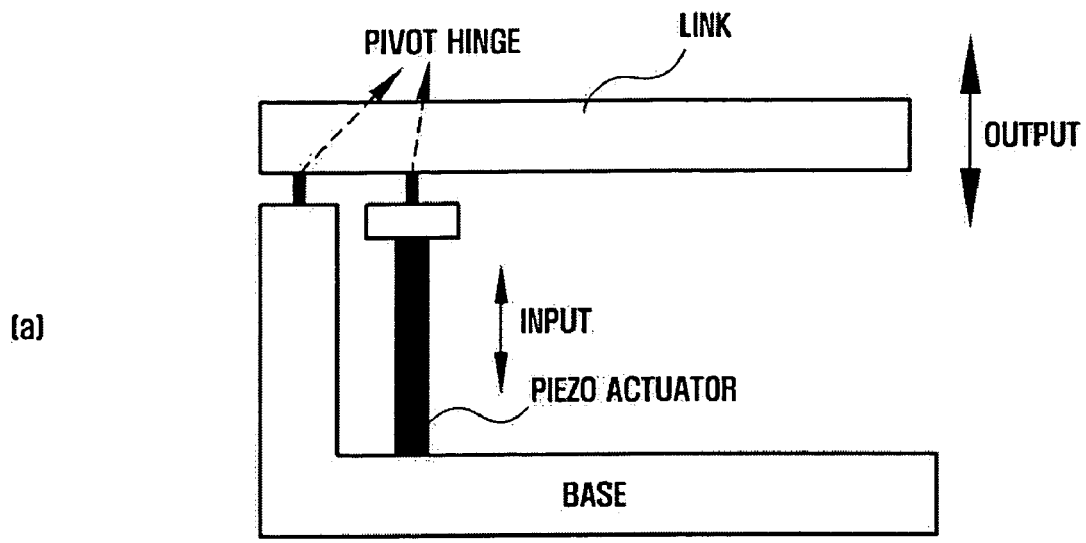
FIG. 7 illustrates two cases of a displacement amplification mechanism.
Figure 7:
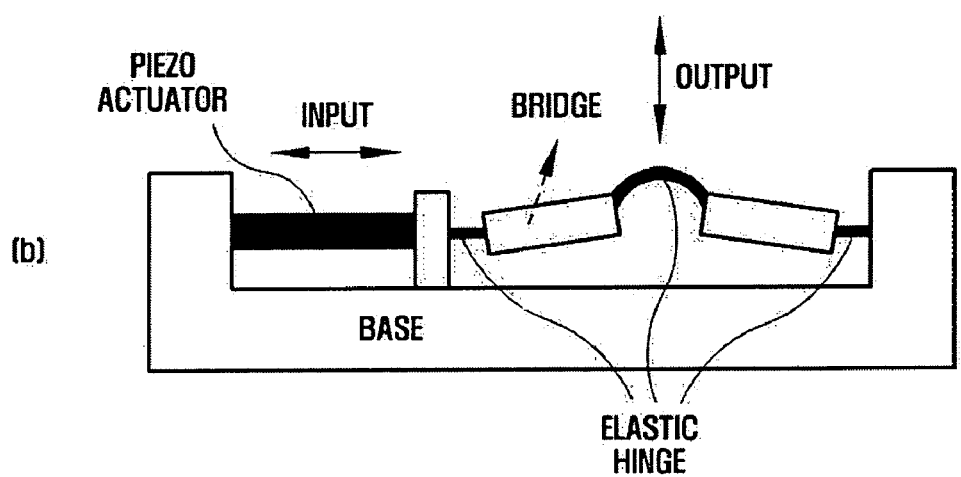

In general, displacement amplification mechanisms are divided into two methods. One method is a lever-type elastic hinge mechanism as illustrated in FIG. 7(a). In a lever-type apparatus which performs the lever-type elastic hinge mechanism, an amplification ratio is determined according to a distance between pivot hinges, and a horizontal link needs to have high rigidity. In the lever-type apparatus, a small number of elastic pivot hinges are required, but a size of the horizontal link and a deformation of the hinges are proportional to the amplification ratio. Hence, high efficiency from the lever-type apparatus is not expected.

The other method is a bridge-type elastic hinge mechanism as illustrated in FIG. 7(b). Since a bridge-type apparatus has a simple and symmetrical structure, it can be designed more easily than the lever-type apparatus. The bridge-type elastic hinge mechanism requires a hinge to have a higher elasticity than the lever-type elastic hinge mechanism. The exemplary embodiments of the present invention employ such a bridge-type elastic hinge mechanism.

The bridge combination 200 is comprised of the three bridge units 210, 230, and 250. The use of the three bridge units 210, 230, and 250 is just an example, and it is apparent to one of ordinary skill in the art that the technical spirit of the present invention can be achieved by arranging a plurality of bridge units at equal angles on a 360 degree plane.

Figure 8:
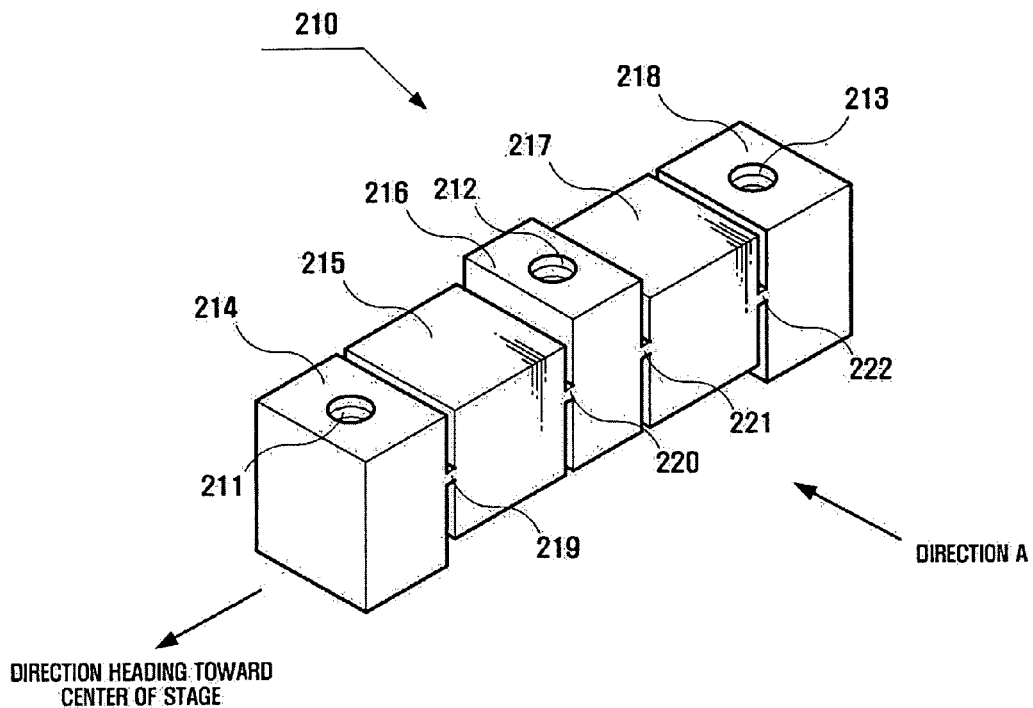
FIG. 8 is a perspective view of a bridge unit according to an exemplary embodiment of the present invention.

FIG. 8 is a perspective view of the bridge unit 210. The bridges units 230 and 250 have the same structure as that of the bridge unit 210. The bridge unit 210 includes a predetermined number of bridge blocks 214 through 218, which have hexahedral shapes, and elastic hinges 219 through 222, which connect the bridge blocks 214 through 218 to each other. The elastic hinges 219 through 222 and the bridge blocks 214 through 218 are formed in one body. A bridge block nearest the center of the motion stage 100, that is, a first bridge block 214, has a second screw hole 211 to be coupled to the fixed hole 303a of the base unit 310. A bridge block farthest from the center of the motion stage 100, that is, a fifth bridge block 218, has a third screw hole 213 to be coupled to the movable hole 302a of the base unit 310. A bridge block in the middle of the arrangement of the bridge blocks 214 through 218, that is, a third bridge block 216, has a first screw hole 212 to be coupled to the motion stage 100.

Although five bridge blocks are used in the present embodiment, the invention is not limited to this. For example, three or more bridge blocks may be used because the technical spirit of the present invention can be achieved if the number of bridge blocks is equal to or greater than three.

Figure 9:
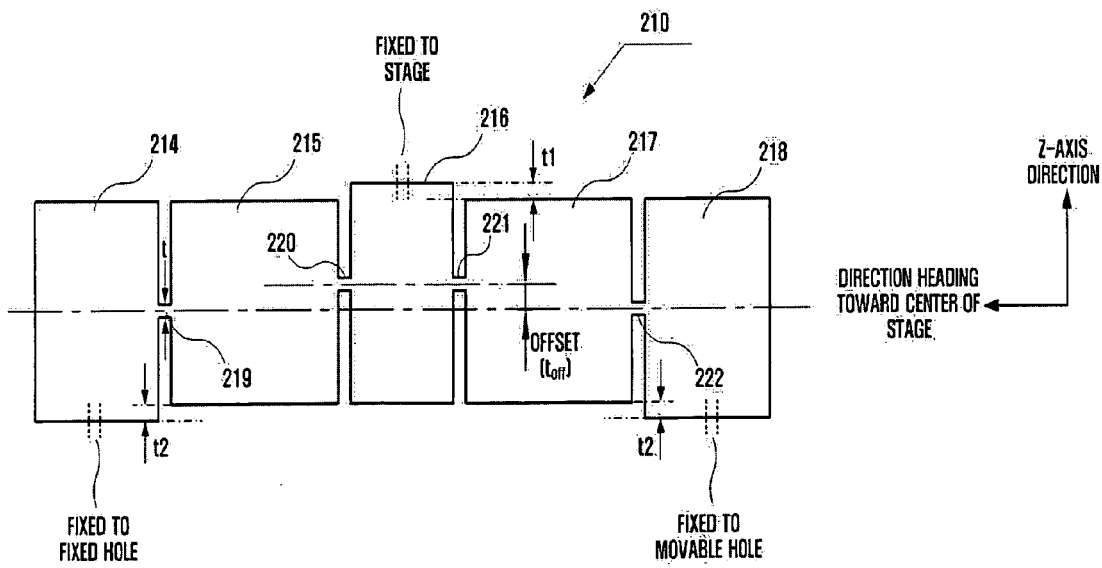
FIG. 9 illustrates a side of the bridge unit of FIG. 8 viewed in direction A.
Figure 10:
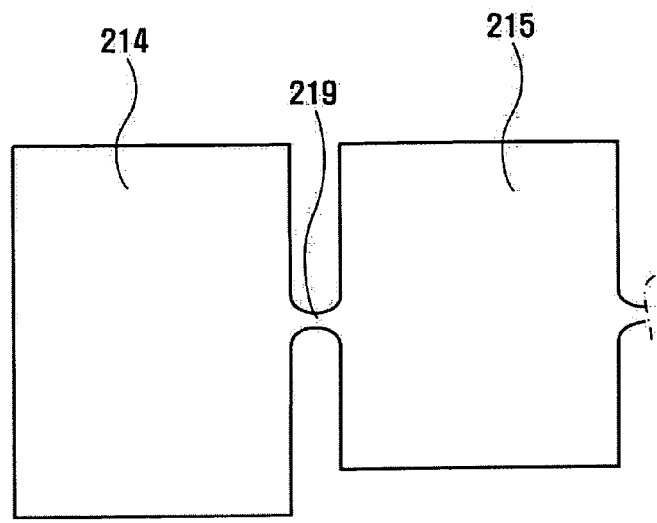
FIG. 10 illustrates an elastic hinge having a shape different from that of an elastic hinge of FIG. 9.

FIG. 9 illustrates a side of the bridge unit 210 of FIG. 8 viewed in direction A. The elastic hinges 219 through 222 for connecting the bridge blocks 214 through 218 to each other have predetermined thicknesses and constant shapes in a direction indicated by "A." The elastic hinges 219 through 222 may be designed to have constant thicknesses relative to the length direction of the bridge unit 210. However, the thicknesses of the elastic hinges 219 through 222 are not necessarily constant in either direction. In other words, each of the elastic hinges 219 through 222 may have a shape concave at the center as in the elastic hinge 219 of FIG. 10 or shapes of other thicknesses. Although it is more difficult to form an elastic hinge shape as illustrated in FIG. 10 than it is to form the elastic hinge shape of FIG. 9, the elastic hinge shape as illustrated in FIG. 10 is more stable than the elastic hinge shape of FIG. 9 when considering a dynamic structure.

Although the elastic hinges 219 through 222 may all have either the same shape or different shapes, it is assumed in the exemplary embodiments of the present invention that they have the same shape and thickness when considering a dynamic balance. Although the shapes of the elastic hinges 219 through 222 are the same, positions thereof are slightly different. As illustrated in FIG. 9, the first and fourth elastic hinges 219 and 222 have the same height h1 in the z-axis direction, and the second and third elastic hinges 220 and 221 have the same height h2 in the z-axis direction. The heights h1 and h2 have a difference corresponding to an offset $t_{off}$. A ratio of a vertical displacement to a horizontal displacement varies according to a value of the offset $t_{off}$.

Since a bottom surface of the first bridge block 214' is fixed to the fixed hole 303a of the base unit 310, and a bottom surface of the fifth bridge block 218 is fixed to the movable hole 302a of the base unit 310, the first and fifth bridge blocks 214 and 218 are t2 lower than the second, third, and fourth bridge blocks 215, 216, and 217. Since an upper surface of the third bridge block 216 must be attached to the motion stage 100, the third bridge block 216 is t1 higher than the other bridge blocks 214, 215, 217, and 218. Because design variables t1 and t2 may be adequately selected by one of ordinary skill in the art according to an actual design environment, their concrete values are not mentioned.

Figure 11:
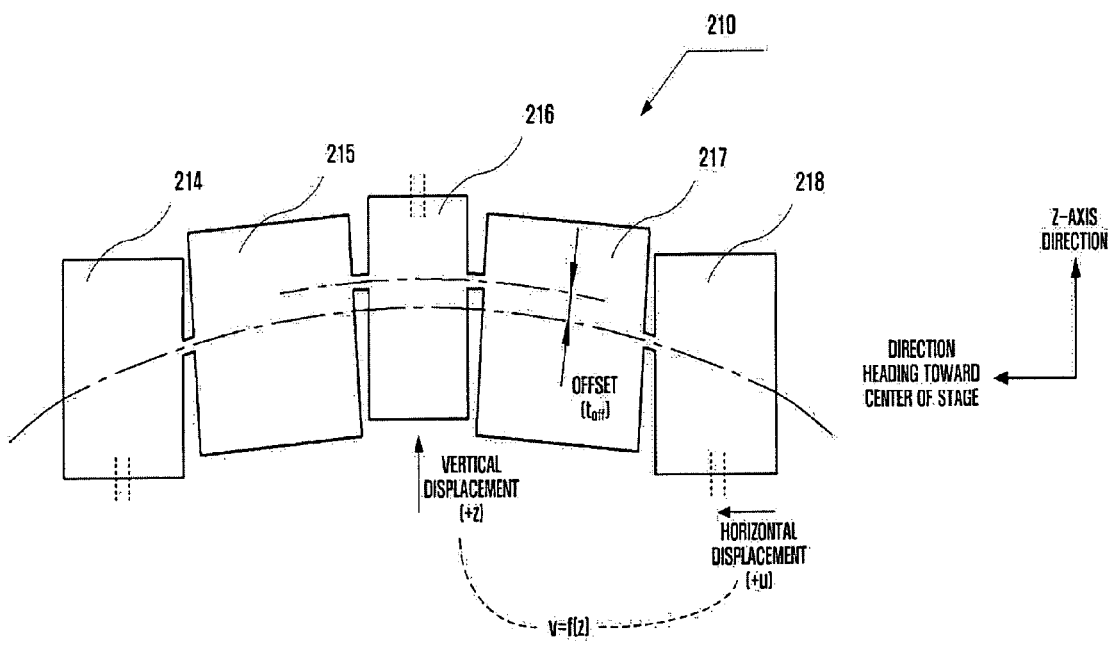
FIG. 11 illustrates a mechanism in which a vertical displacement occurs in a bridge unit due to a horizontal displacement caused by a change in length of a piezo actuator.

FIG. 11 illustrates a mechanism in which a vertical displacement [z] occurs in the bridge unit 210 due to a horizontal displacement [u] caused by a change in length of the piezo actuator 400a. Generally, an initial voltage (a voltage existing in the middle of an operation range) is applied to a piezo actuator before an operation of a micro position-control system. Thereafter, when a voltage higher than the initial voltage is applied to the piezo actuator upon operation, the piezo actuator extends lengthwise. When a voltage lower than the initial voltage is applied to the piezo actuator upon operation, the piezo actuator shrinks lengthwise. In this way, it is possible to increase or decrease the length of a piezo actuator.

When a voltage higher than an initial voltage is applied to the piezo actuator 400a, the piezo actuator 400a extends lengthwise. Accordingly, the movable hole 302a and the fifth bridge block 218 move in a direction farther from the center of the motion stage 100, such that a negative horizontal displacement [−u] occurs. The negative horizontal displacement [−u] causes a negative vertical displacement [−z] of the third bridge block 216.

On the other hand, when a voltage lower than the initial voltage is applied to the piezo actuator 400a, the piezo actuator 400a shrinks lengthwise. Accordingly, the movable hole 302a and the fifth bridge block 218 move towards the center of the motion stage 100, such that a positive horizontal displacement [+u] occurs. The positive horizontal displacement [+u] causes a positive vertical displacement [+z] of the third bridge block 216.

The occurrence of the vertical displacement [z] due to the horizontal displacement [u] is due to an offset $t_{off}$ between heights of the elastic hinges 219 through 222. An amplification ratio, that is, a value of vertical displacement [z] divided by horizontal displacement [u], is determined according to a size of the offset $t_{off}$ and a length of the bridge unit 210. As the offset $t_{off}$ increases, the amplification ratio decreases. As the offset $t_{off}$ decreases, the amplification ratio increases. Hence, a user can control the amount of motion of the motion stage 100 by adjusting the offset $t_{off}$. Typically, about 5 to 10% can be obtained as the amplification ratio.

If the value of the offset $t_{off}$ is determined, a function expressed as z=f(u) is established between the vertical displacement [z] and the horizontal displacement [u]. Such a function is determined by a kinematic relationship and can be ascertained through a simulation or an experiment using a numerical analysis program.

Figure 12:
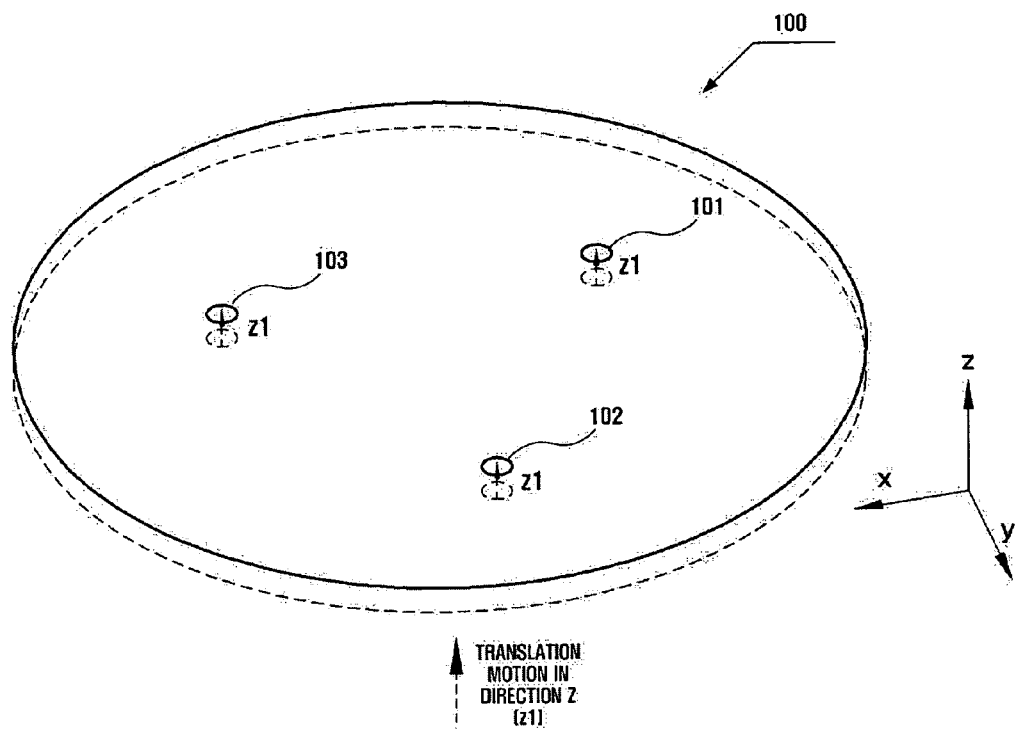
FIG. 12 is a view for explaining a method in which the position-control system controls a Z-direction translation.
Figure 13:
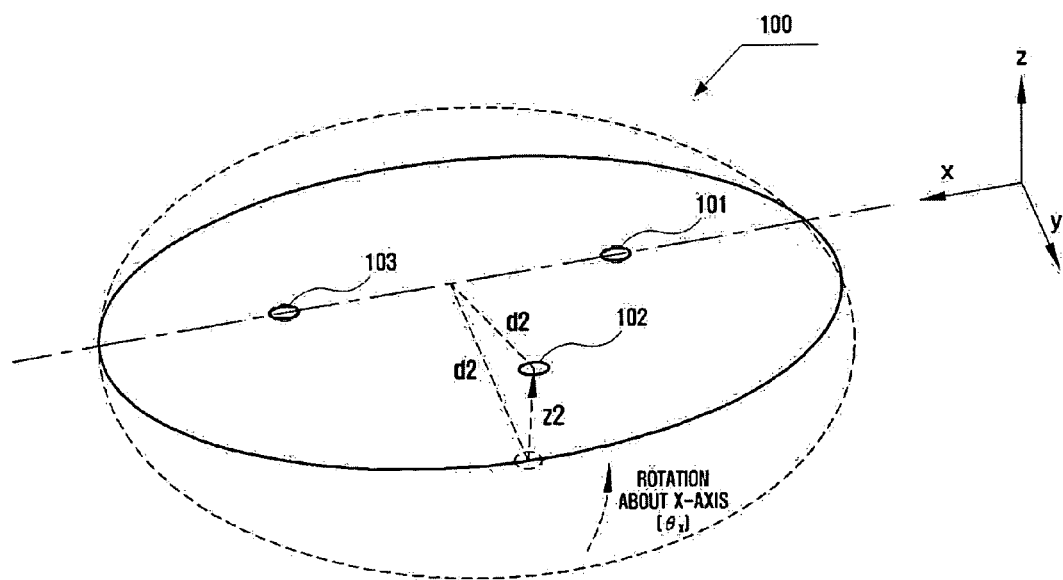
FIG. 13 is a view for explaining a method in which the position-control system controls an X-axis rotation.
Figure 14:
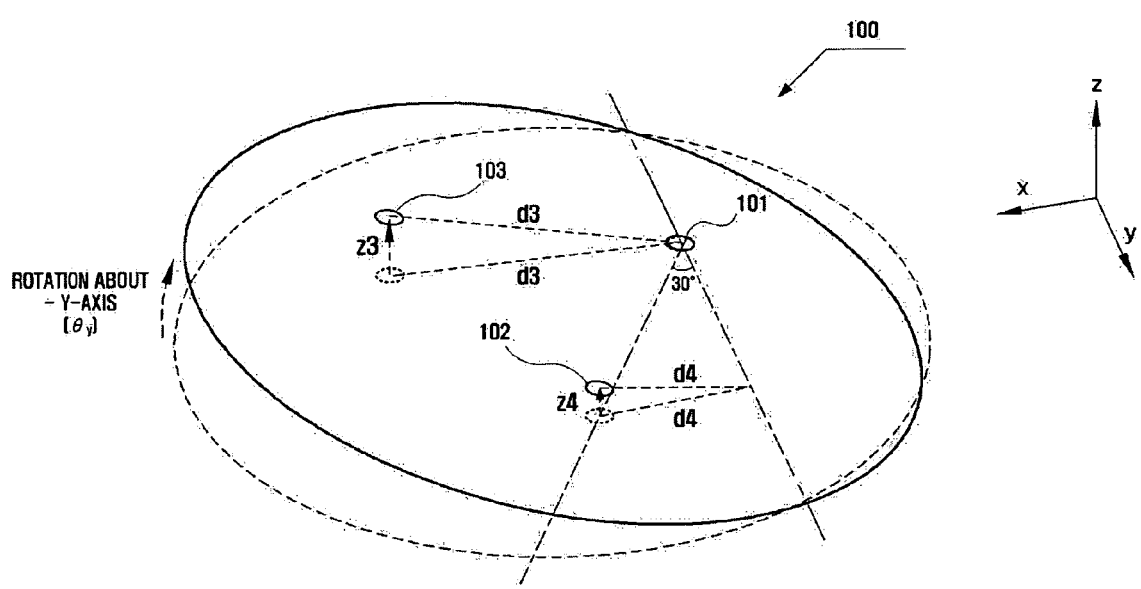
FIG. 14 is a view for explaining a method in which the position-control system controls a Y-axis rotation.

FIGS. 12, 13, and 14 illustrate methods in which the position-control system 1000 controls a Z-direction translation motion, an X-axis rotation, and a Y-axis rotation, respectively. As illustrated in FIG. 12, when the motion stage 100 needs to make a Z-direction translation motion having a displacement of z1, the bridge units 210, 230, and 250 must generate a displacement of z1 in the Z-direction. A horizontal displacement necessary for generating the Z-direction displacement of z1 can be calculated from the function z=f(u). When the length of a piezo actuator decreases by the calculated horizontal displacement of z1, the Z-direction translation motion of FIG. 12, which is a positive Z-direction translation motion, can be achieved. Of course, when the length of a piezo actuator increases by the calculated horizontal displacement of z1, a negative Z-direction translation motion can be achieved.

It is assumed that the motion stage 100 may need to rotate θx about an X-axis as illustrated in FIG. 13. On a plane of the motion stage 100, a Z-axis is determined as one, but X and Y axes are arbitrarily determined. Accordingly, the X-axis needs to be specified first, and consequently, the Y-axis is determined. If a straight line that connects the first and third motion stage holes 101 and 103 among the first, second, and third motion stage holes 101, 102, and 103 of the motion stage 100 that form a rectangular triangle is determined as the X-axis, the X-axis rotation can occur by adjusting the Z-direction displacement of the second motion stage hole 102. The first and third motion stage holes 101 and 103 are rotated an angle of the X-axis rotation although they are not displaced.

When a distance between the straight line and the second motion stage hole 102 is d2, a Z-axis displacement z2 of the second motion stage hole 102, which is required to rotate the motion stage 100 by $\theta_x$ about the X-axis, is obtained using Equation 1:

$$z2 = d2 \times \tan^{-1}(\theta_x) \approx d2 \times \theta_x \quad (1)$$

Referring to Equation 1, since $\theta_x$ is almost 0 in a micro position-control system, z2 can be approximated to a product of d2 and $\theta_x$.

To rotate the motion stage 100 by θx about the X-axis, the Z-axis displacement z2 is obtained from Equation 1, and the bridge unit 220 generates the displacement of z1 in the Z-direction. A horizontal displacement required to achieve the Z-direction displacement of z1 can be calculated from the function z=f(u). Similarly, the motion stage 100 can be rotated $\theta_x$ in a negative X-axis rotation by increasing the length of a piezo actuator by a necessary horizontal displacement.

FIG. 14 illustrates an example where the motion stage 100 rotates $\theta_y$ in a negative Y-axis rotation. In this case, the first motion stage hole 101 is fixed, and the second and third motion stage holes 102 and 103 have different displacements. Geometrically, a distance d4 between the second motion stage hole 102 and an axis passing through the first motion stage hole 101 is half of a distance d3 between the axis and the third motion stage hole 103.

As in Equation 1, a Z-direction displacement z3 of the third motion stage hole 103 can be determined from the distance d3 and the angle $\theta_y$, and a Z-direction displacement z4 of the second motion stage hole 102 can be determined from the distance d4 and the angle $\theta_y$. Since the Z-direction displacements z3 and z4 are the same as those transmitted by the bridge units 250 and 230, respectively, horizontal displacements to be transmitted by the bridge units 250 and 230 can be determined from the Z-direction displacements z3 and z4.

Similarly, the motion stage 100 can be rotated $\theta_y$ in a positive Y-axis rotation by increasing the length of a piezo actuator by the determined horizontal displacement.

The above description has detailed the fact that the micro position-control system according to the present invention supports three degree-of-freedom motions, namely, a Z-axis translation motion, an X-axis rotation, and a Y-axis rotation. The remaining three degree-of-freedom motions can be quite precisely executed using an existing position-control system. Thus, if the micro position-control system according to the exemplary embodiments of the present invention is attached to an existing motion stage (for example, the above-mentioned patent No. 396020) that supports the remaining three degree-of-freedom motions, the micro position-control system according to the present invention is able to support all of the six degree-of-freedom motions.

In the micro position-control system according to the exemplary embodiments of the present invention, a consecutive motion of a piezo actuator, which is an advantage, is maintained to thereby obtaining high resolving power. A driving range and motion characteristics of a motion stage can be changed simply by making a minute design change of a bridge structure instead of by making a change to the entire shape of the micro position-control system.

In addition, a compact micro position-control system can be obtained.

Since the micro position-control system has a space for measuring displacement, a capacitor-type micro displacement measuring device can be installed in the space to control a closed circuit via feedback.

Furthermore, since bridge units are symmetrically arranged to maintain a dynamic balance, an error due to thermal deformation can be minimized, and parasitic motion can be reduced as much as possible.

While the present invention has been particularly shown and described with reference to exemplary embodiments thereof, it will be understood by those of ordinary skill in the art that various changes in form and details may be made therein without departing from the spirit and scope of the present invention as defined by the following claims. Therefore, it is to be understood that the above-described exemplary embodiments have been provided only in a descriptive sense and will not be construed as placing any limitation on the scope of the invention.

What is claimed is:

1. A micro position-control system comprising:
   a base comprising a plurality of base units disposed at equal angles from the center of a motion stage, holding piezo actuators parallel to a direction of the disposition of the base units;
   a plurality of bridge units disposed to face the base units, converting a displacement in a length direction of the piezo actuators into a displacement that is vertical with respect to a bottom surface of the base;
   the motion stage making at least one of a translation motion in the vertical direction, a rotation about a first axis perpendicular to the vertical direction, and a rotation about a second axis perpendicular to both the vertical direction and the first axis; and
   a control unit controlling the piezo actuators.

2. The micro position-control system of claim 1, wherein the base units comprise hinge springs which are elastic in the length direction of the piezo actuators.

3. The micro position-control system of claim 2, wherein each of the hinge springs are formed by alternately arranging straight slots and horizontally asymmetrical half-square-shaped slot pairs along a length direction on each of the base units.

4. The micro position-control system of claim 2, wherein each of the base units comprises:
   a movable hole moving in the length direction of the piezo actuator by an action of the hinge spring when a lengthwise displacement occurs in the piezo actuator; and
   a fixed hole that is fixed regardless of the occurrence of a displacement of the piezo actuator,
   wherein the movable hole of the base unit is coupled to one end of the bridge unit, and the fixed hole of the base unit is coupled to the other end of the bridge unit.

5. The micro position-control system of claim 1, wherein each of the bridge units comprises a plurality of hexahedronal bridge blocks that are aligned in the length direction of the piezo actuator, and adjacent bridge blocks are connected together by elastic hinges.

6. The micro position-control system of claim 5, wherein each of the base units comprises:
   a movable hole moving in the length direction of the piezo actuator due to an action of the hinge spring when a lengthwise displacement occurs in the piezo actuator; and
   a fixed hole that is fixed regardless of the occurrence of a displacement of the piezo actuator,
   wherein the movable hole of the base unit is coupled to a bottom surface of a bridge block that is farthest from the center of the motion stage, and the fixed hole of the base unit is coupled to a bottom surface of a bridge block that is nearest to the center of the motion stage.

7. The micro position-control system of claim 5, wherein an upper surface of a block existing in the middle of the alignment of the bridge units is coupled to the motion stage.

8. The micro position-control system of claim 5, wherein the elastic hinges and the bridge units are formed in one body, and the elastic hinges connected to the bridge block at the middle of the alignment of the bridge units are higher than the elastic hinges which are not connected to the bridge block at the middle of the alignment.

9. The micro position-control system of claim 8, wherein a ratio of a height change of the bridge unit to a length change of the piezo actuator is controlled using a length of the bridge unit and a difference between heights of the elastic hinges.

10. The micro position-control system of claim 5, wherein the elastic hinges have thicknesses that are constant in a length direction of the bridge units.

11. The micro position-control system of claim 5, wherein the elastic hinges have shapes that are concave at centers in the length direction of the bridge units.

12. The micro position-control system of claim 8, wherein when the piezo actuator extends lengthwise, the base units are displaced in a height direction, and when the piezo actuator shrinks, the base units are displaced in a direction opposite to the height direction.

13. The micro position-control system of claim 1, wherein the translation motion in the vertical direction is performed by making the vertical displacements of each of the plurality of bridge units the same.

14. The micro position-control system of claim 1, wherein the rotation about the first axis and the rotation about the second axis are performed by making the vertical displacements of the plurality of bridge units different from one another.

* * * * *